Patented Aug. 14, 1951

2,564,238

UNITED STATES PATENT OFFICE 2,564,238

SILVER AZO DYE BLEACH-OUT PROCESS AND BLEACHING BATHS FOR USE THEREIN

Joseph A. Sprung, Easton, Pa., assignor to General Aniline & Film Corporation, New York, N. Y., a corporation of Delaware No Drawing. Application December 14, 1946, Serial No. 716,422

19 Claims. (Cl. 95—88)

The present invention relates to the silver dye bleach-out process, and more particularly to bleaching baths for use therein which are uniformly capable of bleaching azo dyes in conjunction with a silver image at a rate satisfactory to photographic requirements.

It is known that the silver dye bleach-out process involves the treatment of a silver halide emulsion diffusely dyed with an azo dye and containing a silver image, with a bleaching solution which in cooperation with the silver image destroys the dye at the places of said image, thereby yielding dyestuff images. If the bleaching solution which is employed is acidic, it appears that the azo linkage is first reduced to a hydrazo linkage from which the amino groups are subsequently cleaved or which undergoes a semidine or benzidine rearrangement. There are many proposals contained in the art with respect to bleaching solutions for effecting the destruction of the azo dye at the silver image. One such proposal involves the use of sodium hydrosulfite. The experience of the art has been, however, that this bleach is too powerful, not only reducing the dye at the silver image but also in the other portions of the emulsion layer. It has been impossible up to the present time to obtain satisfactory results with such bleaching solutions.

Another procedure recommends the utilization as a bleach bath of thiourea in an acid solution. The thiourea bleach has been found to be effective with a number of azo dyes. However, it does not act uniformly on all azo dyes, there being a number of dyes, particularly those used for formation of the cyan image, which are unaffected by this bleach within practical time limits.

According to general physical-chemical principles, it has been recognized that any reagent which is capable of reducing the azo linkage in azo compounds or dyestuffs must possess a redox potential more positive than the azo-hydrazo system. According to Conant (Chem. Rev., vol. III, page 1, 1936) and Conant and Pratt (J. Am. Chem. Soc. 48, 2468 (1926)), the apparent redox potential $E^0$ of the azo-hydrazo system, as determined by physical-chemical measurements on a number of azo dyes, lies in the region of approximately $-0.3$ to $-0.4$ volt at a pH of approximately 1. These values are called apparent because the system is irreversible, as may be seen from the following formula:

$$R-N=N-R' + 2H^+ + 2e^- \rightleftarrows R-NH-NH-R \longrightarrow$$

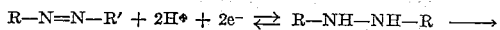

Degradation or rearrangement products

The normal potentials (Latimer, "The Oxidation States of the Elements and Their Potentials in Aqueous Solutions," N. Y., Prentice-Hall, 1938, Appendix I, p. 293) of some common inorganic reducing reagents which are known to reduce azo dyes are as follows:

| | |
|---|---|
| $Sn^{++} \rightleftarrows Sn^{++++} + 2e^-$ | $E^0 = -0.15$ volt |
| $Sn \rightleftarrows Sn^{++} + 2e^-$ | $E^0 = +0.136$ volt |
| $V^{++} \rightleftarrows V^{+++} + e^-$ | $E^0 = +0.2$ volt |
| $Zn \rightleftarrows Zn^{++} + 2e^-$ | $E^0 = +0.762$ volt |

The silver-azo dye bleach-out process operates on the principle that the metallic silver image in combination with the various reagents in the bleach composition functions as the reducing agent for the azo linkage. It is the purpose of these reagents to form a (silver-silver salt or silver complex) redox systems possesing a redox potential more positive than the azo-hydrazo system, thus effecting the reduction of the azo linkage in situ with the silver image.

Many redox systems involving metallic silver are known and their normal $E^0$ values have been determined with great accuracy. The following condensed list is taken from Latimer (above reference, page 182):

| | $E^0$ |
|---|---|
| $Ag^0 \rightleftarrows Ag^+ + e^-$ | $-0.7995$ |
| $2Ag^0 + SO_4^= \rightleftarrows Ag_2SO_4 + 2e^-$ | $-0.65$ |
| $Ag^0 + Cl^- \rightleftarrows AgCl + e^-$ | $-0.222$ |
| $4Ag^0 + Fe(CN)_6^= \rightleftarrows Ag_4Fe(CN)_6 + 4e^-$ | $-0.19$ |
| $Ag^0 + CNS^- \rightleftarrows AgCNS + e^-$ | $-0.09$ |
| $Ag^0 + Br^- \rightleftarrows AgBr + e^-$ | $-0.073$ |
| $Ag^0 + 2S_2O_3^= \rightleftarrows Ag(S_2O_3)_2^\equiv + e^-$ | $-0.01$ |
| $Ag^0 + I^- \rightleftarrows AgI + e^-$ | $+0.150$ |
| $2Ag^0 + S^= \rightleftarrows Ag_2S + 2e^-$ | $+0.71$ |

Theoretically, any of the above systems possessing a redox potential more positive than that of the azo-hydrazo system (approximately $-0.3$ volt at pH=1) should reduce the azo linkage and those possessing the most positive values should be the most effective.

Unfortunately, however, as in most complicated chemical processes, theory cannot be substituted for fact. Thus, while the bleach-out compositions referred to above, particularly the silver-thiourea system, should possess the desired redox potential, it nevertheless is true, as stated, that such bleaching compositions are not sufficiently effective in the bleach-out method to destroy all azo dyes in cooperation with the silver image within practical time limits. This is apparently attributable to the slow rate of bleaching by the system, as a consequence of which no appreciable dye destruction occurs in the time required by good photographic practice.

It is known that the destruction of azo dyes by bleaching agents in the presence of a heavy metal may be greatly accelerated by the utilization in small amounts of compounds of the type of quinones, azines, particularly the phenazines, and the like (see German Patents 167,530, 184,381 and 186,050). This idea, employed in the general dyestuff field, has been carried over to the image-wise destruction of azo dyestuffs at the silver image by bleaching baths. In the use of such compounds in the silver azo dye bleaching method, it has been stated that they effect an acceleration of the dyestuff destruction by virtue of being capable of reversible oxidation and reduction in the system. We have found, however, that it is not this property which is the gauge of the effectiveness of the compounds in the stated relationship, but rather the possession by the compounds of a definite redox potential. Thus quinone ($E°=-0.76$ volt) has the ability of being reduced to hydroquinone which can be reoxidized to quinone. Nevertheless, it is of very little utility in accelerating the rate of bleaching by the usual bleach-out baths. On the other hand, anthraquinone-2-sulfonic acid, which can be reduced in the same manner as quinone, possesses a more positive redox potential (i. e., $E°=-0.187$ volt) and accordingly is effective in catalyzing the dye destruction in cooperation with the silver image. In short, it is only those compounds having the property of reversible oxidation and reduction, which likewise have a high redox potential, that are capable of readily transferring electrons, via semiquinone intermediates (Michaelis, Chem. Rev. 16, 243 (1935)) from the silver image to the azo linkage to thereby catalyze the destruction of the azo dye. As an indication of how such substances as the anthraquinone sulfonic acid catalyze the bleaching reaction, reference is made to the following equations:

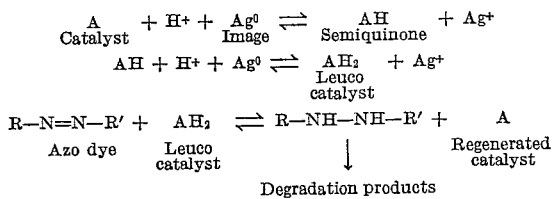

I have now discovered that silver halide emulsions diffusely colored with an azo dye and containing a silver image may be processed to dyestuff images at a rapid rate without the utilization of cataysts, by employing as a bleaching solution a composition containing as its essential components a silver salt former, a silver complex former, and an acid. These compositions have been found to act effectively on azo dyes despite the fact that no catalyst of the aforementioned type is utilized. Apparently these compositions effect this result through a mutual cooperation of the various ingredients as a consequence of which the silver image is given a sufficiently high redox potential so that the reduction of the azo dye is effected within practical time limits. Inasmuch as there are a large number of substances embraced by the general classes of the essential ingredients, considerable leeway is provided the operator in the selection of a bleach bath which will give him optimum results with different types of bleach-out film.

It is accordingly an object of the present invention to provide a bleaching composition for the silver-azo dye bleach-out process.

It is a further object of the invention to provide a bleaching bath for use in the silver azo dye bleach-out process which will effectively bleach the azo dye at the places of the silver image at a rapid rate and without the use of a catalyst.

It is a further object of this invention to provide a three-component composition which will effectively convert the silver image in a diffusely colored silver halide emulsion and at the same time effectively destroy the azo dye at the places of said image.

Other and further important objects of the invention will become apparent as the description proceeds.

It has been stated above that the first essential component of my silver bleach-out bath is a substance which I have characterized as a silver salt former. This substance must be one which is capable of providing ions which react with silver to form a silver salt under the conditions existing at the time of application of the bleach-out bath. The silver salt formers are in turn divisible into three classes of compounds, to wit:

(1) Inorganic substances which in aqueous solution yield ions forming salts with silver and capable of forming systems which possess a redox potential more positive than $-.3$ volt at a pH=1, such as Chloride ions,
Bromide ions,
Iodide ions,
Ferrocyanide ions,
Cyanide ions, and
Thiocyanide ions.

Substances capable of yielding such ions and which I have found to be satisfactory are:

Water-soluble chlorides, such as—
    Hydrochloric acid,
    Potassium chloride,
    Magnesius chloride, and the like,
Water-soluble bromides, such as—
    Hydrogen bromide,
    Sodium bromide,
    Potassium bromide, and the like,
Water-soluble iodides, such as—
    Hydrogen iodide,
    Potassium iodide,
    Sodium iodide and the like,
Water-soluble ferrocyanides, such as—
    Sodium ferrocyanide,
    Potassium ferrocyanide and the like,
Water-soluble cyanides, such as—
    Potassium cyanide,
    Sodium cyanide and the like and
Water-soluble thiocyanides, such as—
    Sodium thiocyanide,
    Potassium thiocyanide and the like.

(2) Tautomerizable sulfur compounds having the grouping:

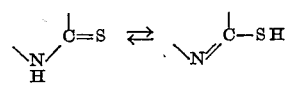

Compounds in this category are:

Mercapto thiazoles having the grouping:

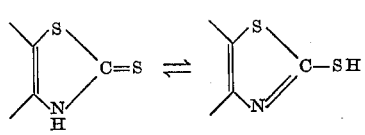

such as—
    2-mercapto-4-methylthiazole,
    2-mercapto-benzothiazole and the like, Mercapto-oxazoles having the grouping:

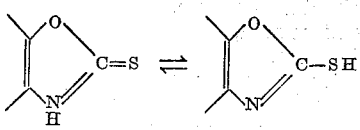

such as 2-mercapto-benzoxazole and the like,
Mercapto-imidazoles having the grouping:

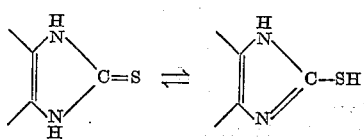

such as—
  2-mercapto-imidazole,
  2-mercapto-benzimidazole,
  2-mercapto-benzimidazole-5-sulfonic acid and the like,
Mercapto-pyridines having the grouping:

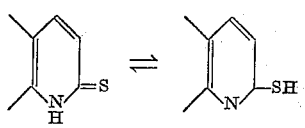

such as—
  2-mercapto-pyridine,
  2-mercapto quinoline and the like,
Thioamides having the grouping:

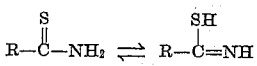

such as—
  Thiourea,
  Thioacetamide,
  4-diethylaminobenzthioamide and the like.

(3) Nitrogenous heterocyclic compounds containing the grouping

and capable of forming metal salts, such as
1.2.3-triazoles having the grouping:

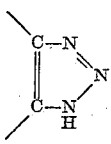

i. e.—
  1.2.3-triazole,
  4.5-dimethyl-1.2.3-triazole,
  Benzotriazole and the like,
1.2.4-triazoles having the grouping:

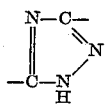

such as—
  1.2.4-triazole,
  3-methyl-1 2.4-triazole,
  3.5-dimethyl-1.2.4-triazole and the like,
Dihydrodiazines having the grouping:

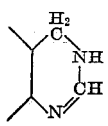

such as 3,4-dihydroquinazoline,

Imidazoles having the grouping:

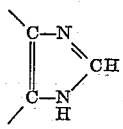

such as—
  Benzimidazole,
  Imidazole,
  Benzimidazole-5-sulfonic acid and the like,
and
1,2,3,4-tetrazoles having the grouping:

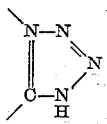

such as—
  Tetrazole,
  5-phenyl tetrazole and the like,
Disulfonimides having the grouping:

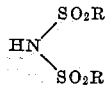

such as imidosulfamide

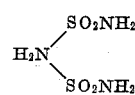

and the like

The second essential component, which I have characterized as silver complex formers, are all nitrogenous heterocyclic bases incapable of reversible oxidation and reduction, having the formula:

wherein Y represents the atoms necessary to complete a 5- or 6-membered heterocyclic ring system. These compounds unlike the quinones, azines and the like are not catalysts since they cannot transfer electrons through semiquinone intermediates. These bases are known to combine with many inorganic salts to form the so-called "Werner complexes." Similarly, they combine with many silver salts, such as:

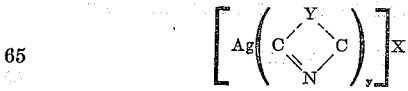

to form complex salts of the formula:

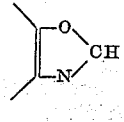

wherein Y has the value given above, X is an anion and y=1 or more.

Representative classes of these compounds are:
Oxazoles having the grouping:

such as—
2,5-dimethyl oxazole,
Benzoxazole,
2-methyl-4,5-dihydro-oxazole,
6-hydroxy-2-methylbenzoxazole,
6-methoxy benzoxazole,
2-ethyl benzoxazole,
2-methyl benzoxazole and the like,
Thiazoles having the grouping:

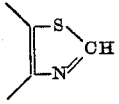

such as—
2,4-dimethyl thiazole,
Benzothiazole,
2-amino benzothiazole,
2-methyl benzothiazole,
2-amino thiazole and the like, and
2-methyl-4,5-dihydrothiazole
Selenazoles having the grouping:

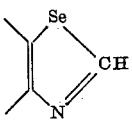

such as—
2,4-dimethylselenazole,
2-methyl-4,5-dihydroselenazole,
Benzoselenazole,
2-methyl-6-methoxyselenazole and the like,
Imidazoles having the grouping:

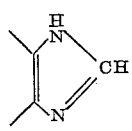

such as—
Imidazole,
1-methylimidazole,
Benzimidazole,
2-mercaptobenzimidazole-5-sulfonic acid,
1,2-dimethylbenzimidazole,
2-propyl-4,5-dihydroimidazole and the like,
1,3-oxazines having the grouping:

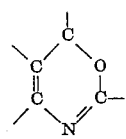

such as 2-phenyl-1,3-oxazine and the like,
1,3-thiazines having the grouping:

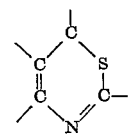

such as 2 - methylnaphtho-[1,8]- m -thiazine and the like,
Pyridines having the grouping:

such as—
Pyridine,
α-Picoline,
2-amino pyridine,
2,4-dihydroxy-6-methylpyridine,
2-acetamino pyridine,
2,6-dimethylpyridine,
α-Picolinic acid,
α-Stilbazole,
1'-hydroxy-α-stilbazole,
γ-Bipyridyl,
α-Bipyridyl and the like,
1,3-diazines having the grouping:

such as—
4-methyl pyrimidine,
2.4-dimethoxy pyrimidine,
4.6-dimethyl pyrimidine,
Perimidine and the like,
Quinolines having the grouping:

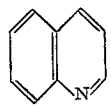 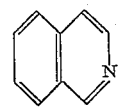

such as—
Quinoline,
Isoquinoline,
Quinaldine,
6-methyl quinoline,
2.6-dimethyl quinoline,
6-methoxy quinoline,
8-hydroxy quinoline,
2.8-dimethoxy quinoline,
6-acetamidoquinoline,
2-methyl-6-ethoxy quinoline,
5-amino quinoline,
6-amino-quinoline,
8-amino quinoline and the like,
Quinazolines having the grouping:

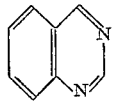

such as—
2-methyl quinazoline,
4-chloro-6-methyl quinazoline,
2.4-dimethyl quinazoline and the like,
Naphthyridines, such as—
1,5-naphthyridine, having the following constitution:

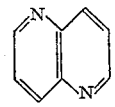

5 - hydroxy-1,6-naphthyridine-7-carboxylic acid having the following constitution:

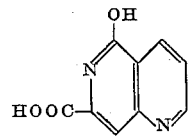

1,8-naphthyridine, having the following constitution:

1,4-dihydroxy-2,7-naphthyridine, having the following constitution:

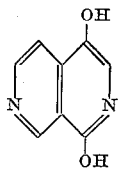

Phenanthridines, such as 9-methyl phenanthridine, having the following constitution:

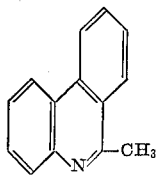

Benzoquinolines, such as—
    6,7-benzoquinoline, having the following constitution:

7,8-benzoquinoline, having the following constitution:

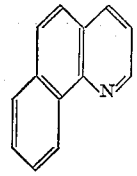

5,6-benzoquinoline, having the following constitution:

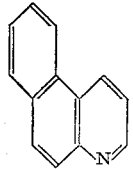

Benzisoquinolines, such as—
    1-methyl-5,6-benzisoquinoline having the following constitution:

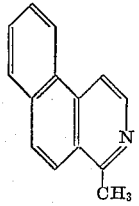

6,7-benzisoquinoline having the following constitution:

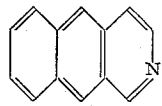

Phenanthrolines, such as—
    1,7-phenanthroline having the following constitution:

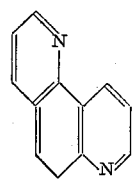

1,10-phenanthroline having the following constitution:

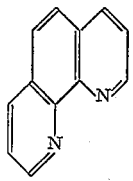

4,7-phenanthroline having the following constitution:

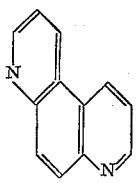

The third essential component of the bleaching compositions is an acid, the chief function of which is to adjust the pH of the composition. The acids may be:

Inorganic, such as—
    Sulfuric,
    Hydrochloric,
    Hydrobromic,
    Hydriodic,
    Phosphoric,
    Nitric,
    Sulfamic and the like,
Organic carboxylic acids, such as—
    Formic,
    Acetic,
    Citric,
    Oxalic,
    Benzoic and the like, or
Organic sulfonic acids, such as—
    p-Toluene sulfonic acid,
    Naphthalene disulfonic acid and the like.

The quantities of the various components in the bleaching composition may vary to adjust the rate of bleaching and image contrast desired. Generally, however, the quantity of the silver salt former and of the silver complex former ranges from about .01 mol to 1 mol per liter of solution. The quantity of the acid employed is such as to neutralize any heterocyclic bases present and to provide such an excess as to insure a pH below 7.

The following examples of bleaching compositions will serve to illustrate the invention, but it is to be understood that these examples are illustrative only. For convenience, these examples are divided into three series, in the first of which only the silver complex former is varied, in the second of which only the salt former is varied, and in the third of which only the acid is varied.

BLEACH SERIES A

*Example 1*

10 g. of potassium iodide
50 g. of 2-aminothiazole (silver complex former)
5 g. of sodium hypophosphite
75 cc. of sulfuric acid
1000 cc. of water The sodium hypophosphite is employed in this composition to prevent formation of iodine from the iodide ions by air oxidation.

*Example 2*

The composition is the same as in Example 1 excepting that the silver complex former is 2- methyl-4,5-dihydrothiazole (2-methyl-Δ²-thiazoline).

*Example 3*

The composition is the same as in Example 1 excepting that the silver complex former is benzimidazole.

*Example 4*

The composition is the same as in Example 1 excepting that the silver complex former is 2-aminobenzothiazole.

*Example 5*

The composition is the same as in Example 1 excepting that the silver complex former is 2-ethylbenzooxazole.

*Example 6*

The composition is the same as in Example 1 excepting that the silver complex former is 2-methylbenzothiazole.

*Example 7*

The composition is the same as in Example 1 excepting that the silver complex former is 2-mercaptobenzimidazole-5-sulfonic acid.

*Example 8*

The composition is the same as in Example 1 excepting that the silver complex former is 6-hydroxy-2-methylbenzoxazole.

*Example 9*

The composition is the same as in Example 1 excepting that the silver complex former is 2-methyl-6-methoxybenzoselenazole.

*Example 10*

The composition is the same as in Example 1 excepting that the silver complex former is pyridine.

*Example 11*

The composition is the same as in Example 1 excepting that the silver complex former is α-picoline.

*Example 12*

The composition is the same as in Example 1 excepting that the silver complex former is 2,6-dimethylpyridine.

*Example 13*

The composition is the same as in Example 1 excepting that the silver complex former is α-picolinic acid.

*Example 14*

The composition is the same as in Example 1 excepting that the silver complex former is 2-aminopyridine.

*Example 15*

The composition is the same as in Example 1 excepting that the silver complex former is 2-acetamidopyridine.

*Example 16*

The composition is the same as in Example 1 excepting that the silver complex former is 2,4-dihydroxy-6-methylpyridine.

*Example 17*

The composition is the same as in Example 1 excepting that the silver complex former is α-stilbazole.

*Example 18*

The composition is the same as in Example 1 excepting that the silver complex former is 1'-hydroxy-α-stilbazole.

*Example 19*

The composition is the same as in Example 1 excepting that the silver complex former is α-bipyridyl.

*Example 20*

The composition is the same as in Example 1 excepting that the silver complex former is γ-bipyridyl.

*Example 21*

The composition is the same as in Example 1 excepting that the silver complex former is quinoline.

*Example 22*

The composition is the same as in Example 1 excepting that the silver complex former is isoquinoline.

*Example 23*

The composition is the same as in Example 1 excepting that the silver complex former is quinaldine.

*Example 24*

The composition is the same as in Example 1 excepting that the silver complex former is 6-methylquinoline.

*Example 25*

The composition is the same as in Example 1 excepting that the silver complex former is 2,6-dimethylquinoline.

*Example 26*

The composition is the same as in Example 1 excepting that the silver complex former is 6-methoxyquinoline.

*Example 27*

The composition is the same as in Example 1 excepting that the silver complex former is 2,8-dimethoxyquinoline.

*Example 28*

The composition is the same as in Example 1 excepting that the silver complex former is 5-aminoquinoline.

*Example 29*

The composition is the same as in Example 1 excepting that the silver complex former is 6-aminoquinoline.

*Example 30*

The composition is the same as in Example 1 excepting that the silver complex former is 8-aminoquinoline.

*Example 31*

The composition is the same as in Example 1 excepting that the silver complex former is 6-acetamidoquinoline.

*Example 32*

The composition is the same as in Example 1 excepting that the silver complex former is 8-hydroxyquinoline.

*Example 33*

The composition is the same as in Example 1 excepting that the silver complex former is 2-methyl-6-ethoxyquinoline.

*Example 34*

The composition is the same as in Example 1 excepting that the silver complex former is 9-methylphenanthridine.

Example 35

The composition is the same as in Example 1 excepting that the silver complex former is 5,6-benzoquinoline.

Example 36

The composition is the same as in Example 1 excepting that the silver complex former is 4,7-phenanthroline.

Example 37

The composition is the same as in Example 1 excepting that the silver complex former is 1,7-phenanthroline.

Example 38

The composition is the same as in Example 1 excepting that the silver complex former is 1,10-phenanthroline.

BLEACH SERIES B

Example 39

30 g. of potassium bromide (silver salt former)
50 g. of quinoline
75 cc. of sulfuric acid
1000 cc. of water

Example 40

The composition is the same as in Example 39 excepting that the silver salt former is benzotriazole.

Example 41

The composition is the same as in Example 39 excepting that the silver salt former is thiourea.

Example 42

The composition is the same as in Example 39 excepting that the silver salt former is potassium thiocyanate.

Example 43

The composition is the same as in Example 39 excepting that the silver salt former is thioacetamide.

Example 44

The composition is the same as in Example 39 excepting that the silver salt former is 4-diethylaminobenzothioamide.

Example 45

The composition is the same as in Example 39 excepting that the silver salt former is 2-mercaptobenzimidazole-5-sulfonic acid.

Example 46

The composition is the same as in Example 39 excepting that the silver salt former is potassium iodide.

BLEACH SERIES C

Example 47

10 g. of potassium iodide
50 g. of quinoline
5 g. of sodium hypophosphite
150 g. of 96% sulfuric acid (acid)
1000 g. of water

Example 48

The composition is the same as that of Example 47 excepting that the acid is 37% hydrochloric acid.

Example 49

The composition is the same as in Example 47 excepting that the acid is 48% hydrobromic acid.

Example 50

The composition is the same as in Example 47 excepting that the acid is 57% hydriodic acid.

Example 51

The composition is the same as in Example 47 excepting that the acid is 80% phosphoric acid.

Example 52

The composition is the same as in Example 47 excepting that the acid is phosphorous acid.

Example 53

The composition is the same as in Example 47 excepting that the acid is 70% nitric acid.

Example 54

The composition is the same as in Example 47 excepting that the acid is sulfamic acid.

Example 55

The composition is the same as in Example 47 excepting that the acid is 1,5-naphthalene disulfonic acid.

Example 56

The composition is the same as in Example 47 excepting that the acid is formic acid.

Example 57

The composition is the same as in Example 47 excepting that the acid is acetic acid.

Example 58

The composition is the same as in Example 47 excepting that the acid is oxalic acid.

Example 59

The composition is the same as in Example 47 excepting that the acid is maleic acid.

Example 60

The composition is the same as in Example 47 excepting that the acid is tartaric acid.

Example 61

The composition is the same as in Example 47 excepting that the acid is 85% lactic acid.

Example 62

The composition is the same as in Example 47 excepting that the acid is citric acid.

Example 63

The composition is the same as in Example 47 excepting that the acid is trichloracetic acid.

The following examples illustrate the processing of photographic film while utilizing the above bleaching baths to produce dyestuff images.

Example 64

A multilayer bleach-out material containing non-migrating yellow, magenta and cyan azo dyes in the blue, green and red-sensitive layers respectively is exposed under a color transparency and developed to a black and white image for 18 minutes at 20° C. in a developer comprising per liter of water 1.5 g. of N-methyl-p-amino phenol sulfate
3.0 g. hydroquinone
80.0 g. sodium sulfite (anhydrous)
0.5 g. potassium bromide
3.0 g. borax The film is then short-stopped and fixed for five minutes in a fixing bath of the following composition:

SOLUTION 1

Hot water _____ cc__ 500
Hypo _____ grams__ 240

SOLUTION 2

Hot water _____ cc__ 150
Sodium sulfite anhydrous _____ grams__ 15
Acetic acid (28%) _____ cc__ 45
Potassium alum _____ grams__ 15

Add Solution 2 to Solution 1 and make up to 1 liter with water. The film is then washed and hardened for three minutes in a composition containing per liter of water—

10 g. of sodium carbonate monohydrate
25 cc. of 36% formalin

The film is washed for 2 minutes, and then treated for 10 to 30 minutes in the azo dye bleach of Example 47. The film is then washed for 5 minutes and bleached for from 5 to 10 minutes with a solution containing per liter of water—

100 g. of copper sulfate
150 g. of potassium bromide
10 cc. of hydrochloric acid The film is washed for 3 minutes, fixed as above for 5 minutes, and finally washed. A tricolor print containing dye images of excellent gradation is thus obtained.

*Example 65*

10 cc. of a 3% aqueous azo dye solution of the yellow azo dye of the following formula:

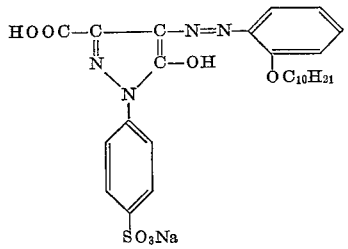

are added to 50 g. of melted silver halide emulsion and the mixture coated on a film base. The film is exposed through a transparency and processed as in the preceding example. A yellow azo dye image of excellent gradation is thus obtained.

*Example 66*

10 cc. of a 3% aqueous azo dye solution containing as the azo dye the compound of the following formula:

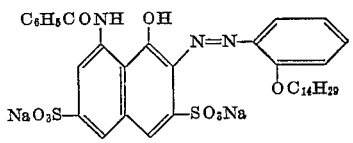

are added to 50 g. of a melted silver halide emulsion and the mixture coated on a film base. When exposed through a transparency and processed as in Example 64, a magenta dyestuff image of excellent hue and density is obtained.

*Example 67*

10 cc. of a 3% aqueous solution of Chlorantine Fast Green BLL is added to 50 g. of melted silver halide emulsion and the mixture coated on a film base. By exposing the film through a transparency and processing as in Example 64, cyan dye images of excellent hue and density are obtained.

*Example 68*

A multilayer film is prepared by casting in sequence on a base a red, green and blue sensitive emulsion containing the azo dyes of Examples 67, 66 and 65 respectively. When exposed through a positive color transparency and processed in accordance with Example 64, a film bearing positive dye images of excellent hue and gradation are obtained.

*Example 69*

The procedure is the same as in Example 65 excepting that in place of the azo dye there employed, there is utilized a yellow azo dye obtained by tetrazotizing the sodium salt of benzidine-2,2'-sulfonic acid and coupling the resulting tetrazonium compound with 1-(3'-heptamido)-phenyl-3-carboxy pyrazolone.

*Example 70*

The procedure is the same as in Example 66 excepting that the magenta azo dye is replaced by a dyestuff obtained by tetrazotizing the sodium salt of benzidine-2,2'-disulfonic acid and coupling the same with the sodium salt of 1-hydroxy-8 - [(3' - heptamido) - benzamido] - naphthalene-3.6-disulfonic acid.

Similar results are obtained if the azo dye employed be that resulting from the tetrazotization of benzidine-2,2'-disulfonic acid and the coupling of the tetrazonium compound with the disodium salt of 1-hydroxy-8-decamidonaphthalene-3.6-disulfonic acid, or with the azo dye obtained by coupling 2-decoxybenzenediazonium chloride with the sodium salt of 1-hydroxy-8-benzenesulfonamidonaphthalene-3.6-disulfonic acid.

*Example 71*

The procedure is the same as in Example 67 excepting that the azo dye employed is Pontamine Fast Green 5BL.

Similar results are obtained if there be employed as the azo dye Diazo Brilliant Green 3–GA, Diazo Fast Green GFL and Brilliant Benzo Green B.

*Example 72*

A photographic film containing per kilo of emulsion 6 g. of the colorless non-diffusing component of the following formula:

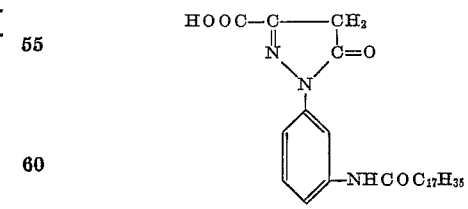

1 - (3'-stearamido)-phenyl-3-carboxy-5-pyrazolone is exposed and developed as in Example 64. The film containing a silver image is then bathed for 3 minutes in a diazonium salt solution of the following composition:

1.7 g. (0.005 mol) of benzidine-2.2'-disulfonic acid which had been tetrazotized according to normal practice are added to a solution of 10 g. of anhydrous sodium acetate in 100 cc. of water. A yellow azo dye is evenly formed throughout the emulsion. The film is then further processed as in Example 64 while utilizing as the bleach bath that of Example 51.

A yellow azo dye image of excellent gradation and spectral characteristics is obtained.

It will be observed that in this example the film is used for exposure in a camera. This is made possible by virtue of the fact that the component which is subsequently converted to the azo dye supplying the final dye image is originally colorless.

*Example 73*

A photographic film containing 6 g. of the colorless non-diffusing component of the formula:

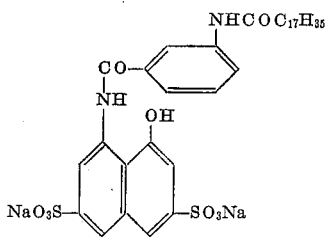

is exposed and developed as in Example 64. After development, the film is bathed for 3 minutes in the diazonium salt solution of Example 72. By this procedure, the emulsion is diffusely dyed with a magenta dyestuff of the following structure:

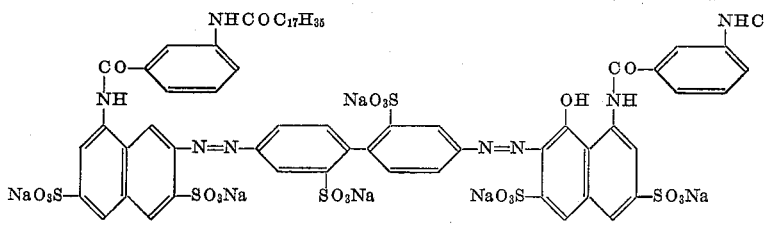

The film is then further processed as in Example 64 to yield a magenta dyestuff image of excellent gradation and spectral characteristics.

*Example 74*

A photographic film was exposed and developed as in Example 64. The film is then bathed in a 1% aqueous solution of Chlorantine Fast Green BLL for 5 minutes. By this treatment, the surface layer of the emulsion is evenly dyed a cyan color. The film is then further proccessed as in Example 64 to yield a cyan dyestuff image of excellent gradation.

Various modifications of the invention will be apparent to those skilled in the art and hence I do not intend to be limited in the patent granted except as necessitated by the appended claims.

I claim:

1. In the process of producing dyestuff images in a photographic element by the imagewise destruction of an azo dye at the silver image of such element, the improvement which comprises effecting such dye destruction with an aqueous bleach-out bath containing as its essential components a silver salt former consisting of a water soluble inorganic halide, a silver complex former incapable of reversible oxidation and reduction consisting of a heterocyclic nitrogenous base in which the heterocyclic N is unsubstituted and which is selected from the class consisting of quinolines and isoquinolines and a sufficient quantity of an acid to provide the bleach-out bath with a pH below 7.

2. The process as defined in claim 1 wherein the silver salt former is a water soluble inorganic iodide, the silver complex former is a quinoline, and the acid is inorganic.

3. The process as defined in claim 1 wherein the silver complex former is a quinoline and wherein the water soluble inorganic halide and the quinoline are present in a quantity of from about .01 to 1 mol per liter.

4. The process as defined in claim 1 wherein the silver salt former is a water-soluble inorganic iodide, the silver complex former is quinoline, and the acid is an inorganic acid.

5. The process as defined in claim 1 wherein the silver salt former is a water-soluble inorganic iodide, the silver complex former is quinoline, and the acid is sulfuric acid.

6. The process as defined in claim 1 wherein the silver salt former is a water-soluble inorganic iodide, the silver complex former is a quinoline, and the acid is sulfuric acid.

7. The process as defined in claim 1 wherein the silver salt former is potassium iodide, the silver salt former is a quinoline, and the acid is sulfuric acid.

8. The process as defined in claim 1 wherein the silver complex former is a quinoline and the acid is sulfuric acid.

9. The process as defined in claim 1 wherein the silver salt former and the silver complex former are present in an amount of from .01 to 1 mol per liter.

10. The process as defined in claim 1 in which the silver salt former is potassium iodide, the silver complex former is quinoline and the acid is sulfuric acid.

11. A silver dye bleach-out bath comprising an aqueous solution containing as its essential components a silver salt former consisting of a water soluble inorganic halide, a silver complex former incapable of reversible oxidation and reduction consisting of a heterocyclic nitrogenous base in which the heterocyclic N is unsubstituted and which is selected from the class consisting of quinolines and isoquinolines and a sufficient quantity of an acid to provide the bleach-out bath with a pH below 7.

12. The silver dye bleach-out bath as defined in claim 11 wherein the silver salt former is a water soluble inorganic iodide, the silver complex former is a quinoline, and the acid is inorganic.

13. The silver dye bleach-out bath as defined in claim 11 wherein the silver complex former is a quinoline and wherein the quinoline and the water soluble inorganic halide are present in an amount of from .01 to 1 mol per liter.

14. The silver dye bleach-out bath as defined in claim 11 wherein the silver salt former is a water-soluble inorganic iodide, the silver complex former is quinoline and the acid is an inorganic acid.

15. The silver dye bleach-out bath as defined in claim 11 wherein the silver salt former is a water-soluble inorganic iodide, the silver complex former is quinoline and the acid is sulfuric acid.

16. The silver dye bleach-out bath as defined in claim 11 wherein the silver salt former is a water-soluble inorganic iodide, the silver complex former is a quinoline and the acid is sulfuric acid.

17. The silver dye bleach-out bath as defined in claim 11 wherein the silver salt former is potassium iodide, the silver salt former is a quinoline, and the acid is sulfuric acid.

18. The silver dye bleach-out bath as defined in claim 11 wherein the silver complex former is a quinoline and the acid is sulfuric acid.

19. The silver dye bleach bath as defined in claim 11 in which the silver salt former is potassium iodide, the silver complex former is quinoline and the acid is sulfuric acid.

JOSEPH A. SPRUNG.

REFERENCES CITED

The following references are of record in the file of this patent:

UNITED STATES PATENTS

| Number | Name | Date |
|---|---|---|
| 2,100,594 | Heymer | Nov. 30, 1937 |
| 2,255,463 | Gaspar | Sept. 9, 1941 |
| 2,270,118 | Gaspar | Jan. 13, 1942 |

FOREIGN PATENTS

| Number | Country | Date |
|---|---|---|
| 430,991 | Great Britain | June 28, 1935 |